United States Patent [19]

Ramello et al.

[11] Patent Number: 5,984,543
[45] Date of Patent: Nov. 16, 1999

[54] APPARATUS AND METHOD FOR PROCESSING AND DIGITIZING A LIGHT-SENSITIVE PHOTOGRAPHIC ELEMENT

[75] Inventors: Piero Ramello, Albissola Superiore; Alfredo Viglienzoni, Savona, both of Italy

[73] Assignee: Minnesota Mining and Manufacturing, St. Paul, Minn.

[21] Appl. No.: 08/851,137

[22] Filed: May 5, 1997

[30] Foreign Application Priority Data

May 9, 1996 [EP] European Pat. Off. .............. 96107348

[51] Int. Cl.$^6$ .................................................. G03D 13/04
[52] U.S. Cl. .............................................. 396/639; 355/27
[58] Field of Search ................................... 396/639, 603, 396/570; 250/580, 581, 582, 252.1; 378/18, 207; 355/27–29

[56] References Cited

U.S. PATENT DOCUMENTS

| | | | |
|---|---|---|---|
| 3,025,779 | 3/1962 | Russell | 134/64 R |
| 3,192,846 | 7/1965 | Wright | 134/122 R |
| 3,344,729 | 10/1967 | Kitrosser | 134/64 R |

(List continued on next page.)

FOREIGN PATENT DOCUMENTS

| | | |
|---|---|---|
| 0 263 508 | 4/1988 | European Pat. Off. . |
| 0 452 570 | 10/1991 | European Pat. Off. . |
| 1052451 | of 0000 | Italy . |
| 57058-137 | of 0000 | Japan . |

OTHER PUBLICATIONS

Research Disclosure vol. 184, Aug. 1979, Item 18431.
Research Disclosure vol. 308, Dec. 1989, Item 308119.
Research Disclosure vol. 235, Nov. 1983, Item 23510.
Research Disclosure vol. 176, Dec. 1978, Item 17643.

*The Theory of Photographic Process*, 4th edition, Macmillian, 1977, by T. H. James, Chapter 8.
*Photographic Processing Chemistry*, Mason, Focal Press, London, 1975.
*The Cyanine Dyes and Related Compounds*, John Wiley and Sons, 1964, Chapter XVII.
*Radiographic Processing*, by D.H.O. John, Focal Press, 1967.
*Radiographic Photography*, by D. N. Chesney and M.O. Chesney, Blackwell Scientific Publications, Oxford, 1965.
"Nucleation and Crystal Growth Rates During the Precipitation of Silver Halide Photographic Emulsions", Gutoff, *Photographic Science and Engineering*, vol. 14, No. 4 (1970), pp. 248–257.
"Effects of Environment on the Growth of Silver Bromide Microcrystals", Berry, *Photographic Science and Engineering*, vol. 5, No. 6, 1961, pp. 332–336.
"Computed Radiography Utilizing Scanning Laser Stimulated Luminescence", M. Sonoda, *Radiation Physics*, Sep. 1983, p. 833.
"Evolution of the Morphology of Silver Bromide Crystals During Physical Ripening", de Cugnac and Chateau, *Science and Industries Photographiques*, vol. 33, No. 2, 1962, pp. 121–125.

*Primary Examiner*—D. Rutledge
*Attorney, Agent, or Firm*—William D. Bauer

[57] ABSTRACT

An apparatus for processing and digitizing an exposed silver halide photographic film comprises processing means in which said exposed photographic film is processed to form an analog image on said film, and digitizing means in which said analog image is photoelectrically read-out to form a digital image representing said analog image. Means for processing the exposed photographic film comprises means for developing, stabilizing and drying of said film. Digitization is effected on a photographic film which has been developed but not fixed and which retains both image-wise developed metallic silver and undeveloped silver halide grains.

2 Claims, 1 Drawing Sheet

U.S. PATENT DOCUMENTS

| | | | |
|---|---|---|---|
| 3,418,246 | 12/1968 | Royce | 252/301.4 H |
| 3,418,247 | 12/1968 | Yocom | 252/301.4 H |
| 3,591,516 | 7/1971 | Rabatin | 252/301.4 H |
| 3,607,770 | 9/1971 | Rabatin | 252/301.4 H |
| 3,617,743 | 11/1971 | Rabatin | 250/483.1 |
| 3,666,676 | 5/1972 | Rabatin | 252/301.4 H |
| 3,667,951 | 6/1972 | Zernov | 430/418 |
| 3,725,704 | 4/1973 | Buchanan | 250/483.1 |
| 3,795,814 | 3/1974 | Rabatin | 250/460 |
| 3,974,389 | 8/1976 | Ferri | 250/483 |
| 4,063,951 | 12/1977 | Bogg | 430/567 |
| 4,067,739 | 1/1978 | Lewis | 430/568 |
| 4,166,742 | 9/1979 | Mifune | 430/568 |
| 4,168,977 | 9/1979 | Takada | 430/446 |
| 4,184,878 | 1/1980 | Maternaghan | 430/567 |
| 4,224,401 | 9/1980 | Takada | 430/437 |
| 4,225,653 | 9/1980 | Brixner | 428/539 |
| 4,237,214 | 12/1980 | Mifune | 430/441 |
| 4,241,164 | 12/1980 | Mifune | 430/264 |
| 4,272,614 | 6/1981 | Mifune | 430/441 |
| 4,306,290 | 12/1981 | Kato | 364/414 |
| 4,311,487 | 1/1982 | Luckey | 23/305 |
| 4,311,871 | 1/1982 | Brunner | 174/74 A |
| 4,386,156 | 5/1983 | Mignot | 430/567 |
| 4,387,141 | 6/1983 | Patten | 428/690 |
| 4,405,691 | 9/1983 | Yale | 428/690 |
| 4,414,306 | 11/1983 | Wey | 430/434 |
| 4,414,310 | 11/1983 | Daubendiek | 430/567 |
| 4,425,425 | 1/1984 | Abbott | 430/502 |
| 4,425,426 | 1/1984 | Abbott | 430/502 |
| 4,434,226 | 2/1984 | Wilgus | 430/567 |
| 4,755,447 | 7/1988 | Kitts, Jr. | 430/139 |
| 4,803,150 | 2/1989 | Dickerson | 430/502 |
| 4,855,221 | 8/1989 | Factor | 430/510 |
| 4,857,446 | 8/1989 | Diehl | 430/510 |
| 4,900,652 | 2/1990 | Dickerson | 430/502 |
| 5,236,816 | 8/1993 | Purol | 430/492 |
| 5,237,358 | 8/1993 | Yamada | 396/570 |
| 5,574,533 | 11/1996 | Itoh | 396/639 |
| 5,664,253 | 9/1997 | Meyers | 396/603 |

APPARATUS AND METHOD FOR PROCESSING AND DIGITIZING A LIGHT-SENSITIVE PHOTOGRAPHIC ELEMENT

FIELD OF THE INVENTION

The present invention relates to an apparatus and a method for processing and digitizing a light-sensitive silver halide photographic element, in particular a medical X-ray film element.

BACKGROUND OF THE INVENTION

The use of X-rays in medical diagnosis has been known for many years. According to conventional techniques, an X-ray image is recorded on a silver halide X-ray film compressed between intensifying phosphor screens in a cassette. The X-ray film, on which the X-ray image has been recorded, is taken out of the cassette, fed into a developing machine and subjected to a development process which is comprised of a series of developing, fixing, washing and drying steps. The X-ray image is thereby developed into a visible image.

Particulars of the radiographic processes are described, for example, in *Radiographic Photography* by D. N. Chesney and M. O. Chesney, Blackwell Scientific Publications, Oxford, 1965, *Radiographic Processing* by D. H. O. John, Focal Press, 1967, or numerous other publications and patents in the field.

Techniques for reading out an X-ray image recorded, as described above, on the X-ray film and converting the image into an electric signal (image signal) by using a film digitizer have heretofore been known. Once the image signal is available, it may be stored, retrieved, processed and then reproduced into a visible image in any of the various ways offered by the digital image processing apparatus suitable for the digitization of photographic images, such as described, for example, by M. Gonoda in *Computed Radiography Utilizing Scanning Laser Stimulated Luminescence*, Radiology, September 1983, p. 833. Apparatus particularly useful for the digitization of conventionally produced X-ray images are commercially available under the trade names of "TRUSCAN" manufactured by Truvel Corp., "300A Computing Densitometer" manufactured by Molecular Dynamics, and "Laser Scanner KFDR-S" manufactured by Konica Corp.

U.S. Pat. No. 4,306,290 discloses means for digitizing a processed photographic film.

U.S. Pat. No. 4,755,447 discloses a wide-dynamic-range latitude silver halide film to be used with X-ray intensifying screen exposure and subsequent digitization and computer enhancement of the images produced thereon.

U.S. Pat. No. 5,237,358 discloses an apparatus for processing and digitizing a radiation image which comprises a) an automatic developing machine for carrying out a developing process on a silver halide photographic film, on which a radiation image has been recorded as a latent image, while said silver halide film is being passed through said automatic developing machine, and b) a film digitizer, which is connected to said automatic developing machine so that it may directly receive said silver halide film after it has been fed out of said automatic developing machine, said film digitizer photoelectrically reading out said radiation image from said silver halide film, which has been converted into a visible image during the developing process, and thereby generating an image signal representing said radiation image.

EP 452,570 discloses an apparatus for automatically processing, scanning and digitizing an exposed X-ray film comprising a) an automatic processing part in which said exposed X-ray film is processed to form an analog image on said film and b) a scanning/digitizing part in which said analog image is scanned and digitized, wherein the processing part and the scanning/digitizing part are directly linked, without any intermediate film storage means.

All these references disclose digitization of photographic images obtained by conventionally processing of image-wise exposed silver halide photographic films, that is developing, fixing, washing and drying of image-wise exposed silver halide photographic films. Image formation by conventional processing of photographic films requires a processing time (dry to dry) of at least 30 seconds. Film readout time must be added to processing time, thus giving a total time of not less than 45 seconds for processing and digitizing a photographic image. Digitization is effected by scanning the surface of the processed photographic film with a lamp located on one side of the film and collecting the light, which has passed through the film and is modulated in accordance with the image recorded on the film, with a radiation-sensitive sensor located on the side opposite to the lamp with respect to the film. Since, however, conventionally processed photographic images are characterized by different scattering of the scanning light crossing the film depending upon the optical density of the image (i.e., low light scattering in the unexposed image areas and high light scattering in correspondence of high optical densities), and light detected by the radiation-sensitive sensor can vary upon the scanning and collecting means due to light scattering, the image signal obtained by the digitization process does not perfectly represents the image information recorded on the photographic film and the image quality of the visible radiation image thus reproduced cannot be kept high. Additionally, present methods of processing and digitizing conventionally produced photographic films represent inconvenient procedures which require considerable time and labor.

SUMMARY OF THE INVENTION

Figure 1:
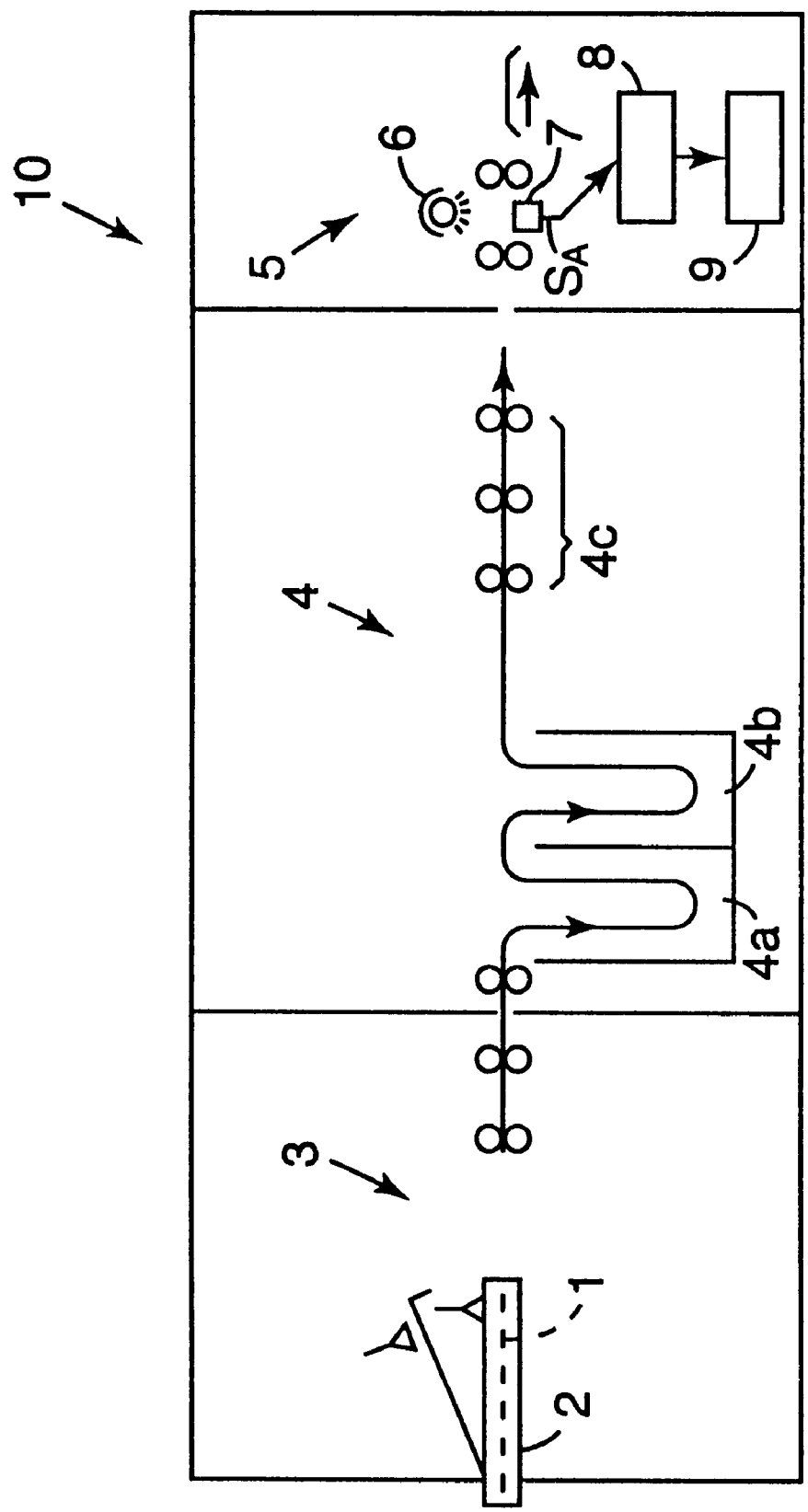
FIG. 1 is a schematic side view showing an embodiment of apparatus for processing and digitizing a photographic image in accordance with the present invention.

The present invention provides an apparatus for processing and digitizing an exposed silver halide photographic film comprising (a) processing means in which said exposed photographic film is processed to form an analog image on said film, and (b) digitizing means in which said analog image is photoelectrically read-out to form a digital image representing said analog image, wherein said processing means comprises means for developing, stabilizing and drying of said film.

The present invention further provides a method for processing and digitizing an exposed silver halide photographic film comprising the steps of (a) feeding an exposed silver halide photographic film to processing means in which said exposed silver halide photographic film is processed to form an analog image on said film, and (b) feeding said analog image to digitizing means in which said analog image is photoelectrically read-out to form a digital image representing said analog image, wherein the processing of said exposed silver halide photographic film comprises the steps of developing, stabilizing and drying.

In accordance with the present invention, wherein digitization is performed onto an analog image formed on an exposed silver halide photographic film which has been developed but not fixed and washed thus retaining both developed metallic silver and undeveloped silver halide grains, time for processing and digitizing the analog image is considerably shortened, corrosive gases, such as sulfur dioxide and acetic acid gases, which are generated by chemical used in the fixing step and can flow from the processing apparatus into the film digitizer, can be avoided, less polluting process is provided by not disposing of fixing effluents, and light scattering properties of exposed and unexposed areas of the analog image are quite similar to each other thus allowing a detected dynamic range compression. Moreover, archiving capability of the photographic images is still maintained since image stability after stabilization processing is quite as good as that after fixation and washing, and the exposed and processed photographic film after digitization may be set in the archives or even subsequently fixed and washed.

DETAILED DESCRIPTION OF THE INVENTION

According to the present invention, there is provided an apparatus for processing and digitizing an exposed silver halide photographic film which comprises means for processing the exposed photographic film and means for digitizing the processed photographic film, wherein said means for processing the exposed silver halide photographic film comprise means for developing, means for stabilizing, and means for drying of said film without a fixing step. One way of carrying out this invention is described in details below with reference to the drawing which illustrates a specific embodiment.

FIG. 1 is a schematic side view of an apparatus 10 for processing and digitizing an exposed silver halide X-ray film in accordance with the present invention.

With reference to FIG. 1, a sheet of silver halide X-ray film 1, is loaded in an X-ray cassette 2 between a front and a back X-ray screen. An X-ray image has been recorded on the X-ray film 1, which is loaded in the cassette 2. The cassette 2, in which the X-ray film 1 carrying the X-ray image recorded thereon is loaded, is set an automatic cassette opener 3 in the apparatus 10. Thereafter, the cassette 2 is opened at the automatic opener 3, and the X-ray film 1, taken out of the cassette 2, is fed into an automatic processing apparatus 4. The X-ray film 1, which has been fed into the automatic processing apparatus 4, is passed through a developing section 4a, a stabilizing section 4b, and a drying section 4c. In this manner, the X-ray film 1 is subjected to development, stabilizing, and drying steps. Thereafter, the processed X-ray film 1 is fed into a film digitizer 5 and conveyed therein along a conveyance path. In the film digitizer 5, means 6 for projecting scanning radiation is located above the conveyance path, along which the X-ray film 1 is conveyed. Means 7 for sensing image-wise modulated scanning radiation (which may be constituted of a CCD array, a photodiode, a phototransistor, a photomultiplier, or the like) is located on the side opposite to scanning means 6 with respect to the X-ray film 1 such that means 7 faces means 6. When the X-ray film 1 is conveyed through the film digitizer 5 and reaches the position between scanning means 6 and sensing means 7, the light produced by scanning means 6 passes through the X-ray film 1. The intensity of the light, which passes through the X-ray film 1, is modified in accordance with the developed and unfixed image recorded on the X-ray film 1 and is detected by sensing means 7. In this manner, an analog image signal SA representing the image information recorded on the X-ray film 1, is obtained. By repeating the scanning and detection of the light (line-wise or in such a way that all pixels are irradiated simultaneously or one after another, e.g. using a laser beam) while the X-ray film 1 is being conveyed between scanning means 6 and sensing means 7, an analog signal is obtained which represents the whole X-ray image recorded on the X-ray film 1. The analog image signal is then amplified by an amplifier 8 and binarized by a conventional analog/digital (A/D) converting means 9 into a digital image signal. The image signal is then fed for further image processing and/or archival into a host computer system (not shown).

In one embodiment of the present invention, the processing apparatus and the film digitizer may be connected to each other, and the film, which has been fed out of the automatic developing apparatus, is fed into the film digitizer directly or connecting means such as film orientation adjusting mechanisms, corrosive gas inflow preventing mechanisms, electrostatic charges discharging mechanisms, or other connecting mechanisms are provided between the processing apparatus and the film digitizer as described, for example, in U.S. Pat. No. 5,237,358. In another embodiment of the present invention, the processing apparatus and the film digitizer may be parts of the same apparatus as described, for example, in EP 452,570, to provide an on-line digitization of photographic films. In a further embodiment of the present invention, intermediate processed film storage means may be provided between a processing apparatus and a film digitizer as separate parts, to provide off-line scanning of photographic films.

In the apparatus of the present invention, a driving mechanism is provided for picking-up the exposed X-ray film at the entrance of the automatic processing machine and guiding said film at constant speed throughout the automatic processing machine and the film digitizer. Preferably, said driving mechanism comprises various pairs of rollers which over various spindles are actuated by a motor. The transport speed through the processing apparatus and the film digitizer can be varied, for example, between 30 and 180 cm/sec and the processing time, dry to dry, to obtain an X-ray image through the developing, stabilizing and rinsing steps is typically less than 30 seconds, preferably less than 20 seconds.

The automatic processing apparatus according to the present invention comprises a developing section, a stabilizing section, and a drying section. The developing section usually comprises a tank containing an alkaline developing solution and is provided with a frame member carrying a plurality of parallel, opposite and/or staggered rollers for transporting the film downwardly and upwardly within the tank, as described for example in U.S. Pat. No. 3,025,779. Alternatively, the developing section may comprise a developing chamber formed by a pair of spaced plates which have fluid distributing inlet slots positioned transversely to the direction of travel of the film in which the film passes in a horizontal way in a simple path and with a limited number of transporting rollers such as a pair of feed rollers and a pair of exit rollers, as described, for example, in U.S. Pat. No. 3,192,846 and U.S. Pat. No. 3,344,729 and IT 1,052,451. The stabilizing section may be in the form of a tank containing a stabilizing solution and may be provided with a frame member carrying a plurality of parallel, opposite and/or staggered rollers for transporting the film downwardly and upwardly within the tanks, or may be in the form of a stabilizing chamber formed by a pair of spaced plates which have fluid distributing inlet slots positioned transversely to the direction of travel of the film in which the film passes in a horizontal way in a simple path and with a limited number of transporting rollers, as described for the developing section. Preferably, the stabilizing section is in the form of a tank provided with a frame member carrying a plurality of parallel, opposite and/or staggered rollers for transporting the film downwardly and upwardly within the tanks and with series of sprayers which spray a stabilizing solution on the opposite sides of the film. Usually, opposite pairs of soft rubber rollers are provided before the drying section to squeeze the film before it enters the drying section.

In another aspect, the present invention relates to a method for processing and digitizing an exposed silver halide photographic film comprising the steps of
(a) feeding an exposed silver halide photographic film to an automatic processing apparatus in which said exposed silver halide photographic film is processed to form an analog image on said film, and
(b) feeding said analog image to a film digitizer in which said analog image is photoelectrically read-out to form a digital image representing said analog image,
wherein the processing of said exposed silver halide photographic film comprises the steps of developing, stabilizing and drying without fixing of the film.

The developing agents employed in the aqueous alkaline developing solution for use in the present invention are well-known and widely used in photographic processings. Useful developing agents are chosen among the class of ascorbic acid, reductic acid and dihydroxybenzene compounds. Among the dihydroxybenzene compounds, the preferred developing agent is hydroquinone. Other useful dihydroxybenzene developing agents include chlorohydroquinone, bromohydroquinone, isopropylhydroquinone, tolylhydroquinone, methylhydroquinone, 2,3-dichlorohydroquinone, 2,5-dimethylhydroquinone, 2,3-dibromohydroquinone, 1,4-dihydroxy-2-acetophenone-2,5-dimethylhydroquinone, 2,5-diethylhydroquinone, 2,5-di-p-phenethylhydroquinone, 2,5-dibenzoylhydroquinone, and 2,5-diacetylhydroquinone.

The aqueous alkaline developing solution for use in the practice of this invention may also comprise auxiliary developing agents showing a superadditive effect, as described in Mason, *Photographic Processing Chemistry*, Focal Press, London, 1975.

For the purpose of the present invention, the preferred superadditive auxiliary developing agents are those described in U.S. Pat. No. 5,236,816. Particularly useful are the auxiliary developing agents such as aminophenol and substituted amino phenol (e.g., N-methyl-p-aminophenol, also known as Metol and 2,4-diaminophenol) and pyrazolidones (e.g., 1-phenyl-3-pyrazolidone, also known as Phenidone) and substituted pyrazolidones (e.g., 1-phenyl4-methyl-3-pyrazolidone, 1-phenyl-4-methyl-4-hydroxymethyl-3-pyrazolidone, also known as Dimezone S, and 1-phenyl4,4'-dimethyl-3-pyrazolidone, also known as Dimezone).

The aqueous alkaline photographic developing solution for use in the practice of this invention contains a sulfite preservative at a level sufficient to protect the developing agents against the aerial oxidation and thereby assure good stability characteristics. Useful sulfite preservatives include sulfites, bisulfites, metabisulfites and carbonyl bisulfite adducts. Typical examples of sulfite preservatives include sodium sulfite, potassium sulfite, lithium sulfite, ammonium sulfite, sodium bisulfite, potassium metabisulfite, sodium formaldehyde bisulfite salt. Also ascorbic acid may be a known preservative agent against aerial oxidation of the developer for use in the bath.

Typically, the dihydroxybenzene developing agent is used in an amount of from 0.040 to 0.70 moles per liter, more preferably in an amount of from 0.08 to about 0.40 moles per liter; the 3-pyrazolidone developing agent is used in an amount of from 0.001 to 0.05 moles per liter, more preferably in an amount of from 0.0005 to 0.01 moles per liter; the sulfite preservative is used in an amount of from 0.03 to 1.0 moles per liter, more preferably in an amount of from 0.10 to 0.70 moles per liter.

In carrying out the method of this invention, it is preferred to use an organic antifogging agent to minimize fog formation in the processed element. Preferred organic antifogging agents for specific use in the developing solutions are tetrazole, benzotriazole and benzimidazole antifogging agents. Useful quantities, when they are included in the developing bath may vary from 0.01 to 5 grams per liter.

In addition to the essential components specified hereinabove, the developing solutions can optionally contain any of a wide variety of addenda, as known, useful in photographic developing solutions. For example, they can contain solvents, buffers, sequestering agents, development accelerators, agents to reduce swelling of the emulsion layers, and the like.

The stabilizing step, following the developing step, converts the residual undeveloped silver halides into more stable complexes, insensitive to both light and aerial oxidation, which are left in the final developed but unfixed film. The stabilizing step enables the final wash to be eliminated and allows for a significant decrease in processing time. By this stabilization step, undeveloped silver halides remain in the film, but are transformed into inert compounds, and stabilized films can be kept for several years without visible deterioration. Using the stabilization step, the film must be dried directly after its emergence from the stabilizing bath thus avoiding the wash step (which is one of the longest steps). In conventional processes, including a fixing step after the developing step, undeveloped silver halides are removed by the action of thiosulfate compounds and subsequent washing. Stabilization process is described, for example, in L. F. A. Mason, *Photographic Processing Chemistry*, pp. 191–194, and in *The Theory of the Photographic Processing*, fourth edition edited by T. H. James, pp. 444–447. Stabilizing solutions usually comprise aqueous solutions of silver complexing agents, for example, thiourea, ethylenethiourea, thiocyanates, aromatic thiol compounds such as 1-phenyl-1H-tetrazole-5-thiol, thiosalicilic acid, monothiohydroquinone, monothiocathecol, ortho- and meta-amino thiophenols, and para-mercaptobenzene sulfonic acid, and aliphatic thiol compounds, such as thioglycolic acid, dithio oxamide, mercaptosuccinic acid and thiobarbituric acid, which form with the undeveloped silver halides grains silver complexes insoluble in the stabilizing solution. Almost all stabilizing solutions are acidic, mainly to act as an effective stop-bath for the previous development step. Alternatively, the stabilizing solution may be a simply acidic stop bath by which image stability after development step is never as good as that after proper stabilization processing since visible unstabilized images cannot be kept for several years without visible deterioration, but image acquisition by digitization can be properly performed according to the present invention. Advantageously a short rinsing step may be provided between the stabilizing and the drying steps.

In the drying step, the aim is to remove water from the film, without damaging the silver image. The usual method of drying films is to blow a current of heated air over the swollen gelatin layers, until the gelatin is substantially dry. Depending upon the air conditions, a residual moisture content of between 10% and 15% remains in the gelatin. If overdried, the gelatin layer becomes brittle and cracks when bent. Before drying, usually surface water is removed from the surfaces of the film, for example with opposite air squeegees or opposite pair of soft rubber rollers before the drying section. The rate of drying depends upon the air temperature and its relative humidity. The higher the former and the lower the latter, the faster will be the rate of drying. There are, however, limiting conditions which should never be exceeded to avoid, for example, brittleness, stickiness or melting of the gelatin layers. The drying air is normally used in the temperature range of 20° C. to 40° C., with a relative humidity between 40% and 70%. Alternatively or simultaneously with heated air, drying by infrared heaters or microwave may also be used.

In a further aspect, the present invention relates to a method of digital imaging of a processed photographic film in which the processed film comprising an analog image is read out by using a film digitizer to form a digital image representing said analog image, wherein said analog image comprises silver and light-stable silver complexes.

The apparatus and the methods according to the present invention can be applied to processing and digitizing black and white silver halide photographic materials, such as silver halide X-ray and Graphic Arts materials.

In particular, useful photographic elements which can be processed according to this invention contain silver halide emulsions that may be silver chloride, silver chlorobromide, silver iodo-bromide, silver iodo-chloro-bromide or any mixture thereof. Generally, the iodide content of the silver halide emulsions is less than about 10% iodide moles, said content being based on the total silver halide. The silver halide emulsions are usually monodispersed or narrow grain size distribution emulsions, as described for examples in U.S. Pat. Nos. 4,166,742; 4,168,977; 4,224,401; 4,237,214; 4,241,164; 4,272,614 and 4,311,871. The silver halide emulsions may comprise a mixture of emulsions having different grain combinations, for example a combination of an emulsion having a mean grain size above 0.7 micrometers, as described in JP 57-58137 or a combination of two emulsions, both having a grain size below 0.4 micrometers, such as for example a first silver halide emulsion having a mean grain size of 0.1 to 0.4 micrometers and a second silver halide emulsion with particles having a mean grain volume lower than one half the particles of the first emulsion.

In particular, useful photographic elements in this invention are silver chloride elements as conventionally employed in forming half tone, dot and line images usually called "lith" elements. Said elements contain silver halide emulsions comprising preferably at least 50 mole % of silver chloride, more preferably at least 80 mole % of silver chloride, the balance, if any, being silver bromide. If desired, said silver halides can contain a small amount of silver iodide, in an amount that is usually less than about 5 mole %, preferably less than 1 mole %. The average grain size of silver halide used in lith emulsions is lower than 0.7 micrometers, preferably lower than 0.4 micrometers, more preferably lower than 0.2 micrometers. Other references to lith materials can be found in Research Disclosure 235, Item 23510, November 1983.

Silver halide photographic elements for X-ray exposures which can be processed according to the present invention comprise a transparent film base, such as polyethylene-terephthalate and polyethylene-naphthalate film base, having on at least one of its sides, preferably on both its sides, a silver halide emulsion layer.

The silver halide grains in the radiographic emulsion may be regular grains having a regular crystal structure such as cubic, octahedral, and tetradecahedral, or a spherical or irregular crystal structure, or those having crystal defects such as twin planes, epitaxialisation, or those having a tabular form, or combinations thereof.

The term "cubic grains" according to the present invention is intended to include substantially cubic grains, that is, silver halide grains which are regular cubic grains bounded by crystallographic faces (100), or which may have rounded edges and/or vertices or small faces (111), or may even be nearly spherical when prepared in the presence of soluble iodides or strong ripening agents, such as ammonia. The silver halide grains may be of any required composition for forming a negative silver image, such as silver chloride, silver bromide, silver chlorobromide, silver bromolodide, silver bromochloroiodide, and the like. Particularly good results are obtained with silver bromoiodide grains, preferably silver bromolodide grains containing about 0.1 to 15% moles of iodide ions, more preferably about 0.5 to 10% moles of iodide ions and still preferably silver bromoiodide grains having average grain sizes in the range from 0.2 to 3 $\mu$m, more preferably from 0.4 to 1.5 $\mu$m. Preparation of silver halide emulsions comprising cubic silver halide grains is described, for example, in Research Disclosure, Vol. 176, December 1978, Item 17643, Vol. 184, August 1979, Item 18431 and Vol 308, December 1989, Item 308119.

Other silver halide emulsions for radiographic elements having highly desirable imaging characteristics are those which employ one or more light-sensitive tabular grain emulsions as disclosed in U.S. Pat. No. 4,425,425 and U.S. Pat. No. 4,425,426. The tabular silver halide grains contained in the silver halide emulsion layers have an average diameter to thickness ratio (often referred to in the art as aspect ratio) of at least 2:1, preferably 3:1 to 20:1, more preferably 3:1 to 10:1, and most preferably 3:1 to 8:1. Average diameters of the tabular silver halide grains range from about 0.3 $\mu$m to about 5 $\mu$m, preferably 0.5 $\mu$m to 3 $\mu$m, more preferably 0.8 $\mu$m to 1.5 $\mu$m. The tabular silver halide grains have a thickness of less than 0.4 $\mu$m, preferably less than 0.3 $\mu$m and more preferably less than 0.2 $\mu$m.

The tabular silver halide grain characteristics described above can be readily ascertained by procedures well known to those skilled in the art. The term "diameter" is defined as the diameter of a circle having an area equal to the projected area of the grain. The term "thickness" means the distance between two substantially parallel main planes constituting the tabular silver halide grains. From the measure of diameter and thickness of each grain the diameter to thickness ratio of each grain can be calculated, and the diameter to thickness ratios of all tabular grains can be averaged to obtain their average diameter to thickness ratio. By this definition the average diameter to thickness ratio is the average of individual tabular grain diameter to thickness ratios. In practice, it is simpler to obtain an average diameter and an average thickness of the tabular grains and to calculate the average diameter to thickness ratio as the ratio of these two averages. Whatever the method used may be, the average diameter to thickness ratios obtained do not differ greatly.

In the silver halide emulsion layer containing tabular silver halide grains, at least 15%, preferably at least 25%, and, more preferably, at least 50% of the silver halide grains are tabular grains having an average diameter to thickness ratio of not less than 3:1. Each of the above proportions, "15%", "25%" and "50%" means the proportion of the total projected area of the tabular grains having an average diameter to thickness ratio of at least 3:1 and a thickness lower than 0.4 μm, as compared to the projected area of all of the silver halide grains in the layer.

As described above, commonly employed halogen compositions of the silver halide grains can be used. Typical silver halides include silver chloride, silver bromide, silver chloroiodide, silver bromoiodide, silver chlorobromoiodide and the like. However, silver bromide and silver bromoiodide are preferred silver halide compositions for tabular silver halide grains with silver bromoiodide compositions containing from 0 to 10 mole % silver iodide, preferably from 0.2 to 5 mole % silver iodide, and more preferably from 0.5 to 1.5 mole % silver iodide. The halogen composition of individual grains may be homogeneous or heterogeneous.

Silver halide emulsions containing tabular silver halide grains can be prepared by various processes known for the preparation of radiographic elements. Silver halide emulsions can be prepared by the acid process, neutral process or ammonia process, or in the presence of any other silver halide solvent. In the stage for the preparation, a soluble silver salt and a halogen salt can be reacted in accordance with the single jet process, double jet process, reverse mixing process or a combination process by adjusting the conditions in the grain formation, such as pH, pAg, temperature, form and scale of the reaction vessel, and the reaction method. A silver halide solvent, such as ammonia, thioethers, thioureas, etc., may be used, if desired, for controlling grain size, form of the grains, particle size distribution of the grains, and the grain-growth rate.

Preparation of silver halide emulsions containing tabular silver halide grains is described, for example, in de Cugnac and Chateau, "Evolution of the Morphology of Silver Bromide Crystals During Physical Ripening", Science and Industries Photographiques, Vol. 33, No. 2 (1962), pp.121–125, in Gutoff, "Nucleation and Growth Rates During the Precipitation of Silver Halide Photographic Emulsions", Photographic Science and Engineering, Vol. 14, No. 4 (1970), pp. 248–257, in Berry et al., "Effects of Environment on the Growth of Silver Bromide Microcrystals", Vol. 5, No.6 (1961), pp. 332–336, in U.S. Pat. Nos. 4,063,951, 4,067,739, 4,184,878, 4,434,226, 4,414,310, 4,386,156, 4,414,306 and in EP Pat. Appln. No. 263,508.

In preparing the silver halide emulsions for photographic elements, a wide variety of hydrophilic dispersing agents for the silver halides can be employed. Gelatin is preferred, although other colloidal materials such as gelatin derivatives, colloidal albumin, cellulose derivatives or synthetic hydrophilic polymers can be used as known in the art. Other hydrophilic materials useful known in the art are described, for example, in Research Disclosure, Vol. 308, Item 308119, Section IX. The amount of gelatin employed in a radiographic element is such as to provide a total silver to gelatin ratio higher than 1 (expressed as grams of Ag/grams of gelatin). In particular the silver to gelatin ratio of the silver halide emulsion layers is in the range of from 1 to 1.5.

The radiographic element which can be processed according to the present invention can be forehardened to provide a good resistance in rapid processing conducted in automatic processing machine without the use of hardeners in processing solutions. Examples of gelatin hardeners are aldehyde hardeners, such as formaldehyde, glutaraldehyde and the like, active halogen hardeners, such as 2,4-di-chloro6-hydroxy-1,3,5-triazine, 2-chloro4,6-hydroxy-1,3,5-triazine and the like, active vinyl hardeners, such as bis-vinylsulfonyl-methane, 1,2-vinylsulfonyl-ethane, bis-vinylsulfonyl-methyl ether, 1,2-bis-vinyl-sulfonylethyl ether and the like, N-methylol hardeners, such as dimethylolurea, methyloldimethyl hydantoin and the like, and bi-,tri-,or tetra-vinylsulfonyl substituted organic hydroxy compounds, such as 1,3-bis-vinylsulfonyl-2-propanol and the like. Other useful gelatin hardeners may be found in Research Disclosure, Vol. 308, December 1989, Item 308119, Paragraph X.

The above described gelatin hardeners may be incorporated in the silver halide emulsion layer or in a layer of the silver halide radiographic element having a water-permeable relationship with the silver halide emulsion layer. Preferably, the gelatin hardeners are incorporated in the silver halide emulsion layer.

The amount of the above described gelatin hardener that is used in the silver halide emulsion of the radiographic element of this invention can be widely varied. Generally, the gelatin hardener is used in amounts of from 0.5% to 10% by weight of hydrophilic dispersing agent, such as the above described highly deionized gelatin, although a range of from 1% to 5% by weight of hydrophilic dispersing agent is preferred.

The gelatin hardeners can be added to the silver halide emulsion layer or other component layers of the radiographic element utilizing any of the well-known techniques in emulsion making. For example, they can be dissolved in either water or a water-miscible solvent such as methanol, ethanol, etc. and added into the coating composition for the above mentioned silver halide emulsion layer or auxiliary layers.

The silver halide emulsions can be chemically and optically sensitized by known methods.

Spectral sensitization can be performed with a variety of spectral sensitizing dyes known in the art. An example of such spectral sensitizing dyes is the polymethine dye class, including cyanines, complex cyanines, merocyanines, complex merocyanines, oxonols, hemioxonols, styryls, merostyryls and streptocyanines.

Although native UV-blue sensitivity of silver halides is usually known in the art, significant advantage can be obtained by the use of spectral sensitizing dyes, even when their principal absorption is in the spectral region to which the silver halide emulsion have their native sensitivity.

Preferably, spectral sensitizing dyes according to this invention are those which exhibit J aggregates if adsorbed on the surface of the silver halide grains and a sharp absorption band (J-band) with a bathochromic shift with respect to the absorption maximum of the free dye in aqueous solution. Spectral sensitizing dyes producing J aggregates are well known in the art, as illustrated by F. M. Hamer, *Cyanine Dyes and Related Compounds*, John Wiley and Sons, 1964, Chapter XVII and by T. H. James, *The Theory of the Photographic Process,* 4th edition, Macmillan, 1977, Chapter 8. The use of J-band exhibiting dyes allows the reduction of the well-known problem of crossover.

The silver halide emulsion layers can contain other constituents generally used in photographic products, such as binders, hardeners, surfactants, speed-increasing agents, stabilizers, plasticizers, gelatin extenders, optical sensitizers, dyes, ultraviolet absorbers, etc., and reference to such constituents can be found, for example, in Research Disclosure, Vol. 176, December 1978, Item 17643, Vol. 184, August 1979, Item 18431 and Vol 308, December 1989, Item 308119.

The photographic elements can be prepared by coating the light-sensitive silver halide emulsion layers and other auxiliary layers on a support. Examples of materials suitable for the preparation of the support include glass, paper, polyethylene-coated paper, metals, polymeric film such as cellulose nitrate, cellulose acetate, polystyrene, polyethylene terephthalate, polyethylene naphthalenate, polyethylene, polypropylene and other well known supports. Preferably, the silver halide emulsion layers are coated on the support at a total silver coverage of at least 1 $g/m^2$, preferably in the range of from 2 to 5 $g/m^2$.

Auxiliary layers can be represented by top-coating layers, antistatic layers, antihalo layer, protective layers, dye underlayers, and the like. Dye underlayers are particularly useful in order to reduce the cross-over of the double coated silver halide radiographic material. Reference to well-known dye underlayer can be found in U.S. Pat. No. 4,900,652, U.S. Pat. No. 4,855,221, U.S. Pat. Nos. 4,857,446, 4,803,150. According to a preferred embodiment, a dye underlayer is coated on at least one side of the support, more preferably on both sides of the support, before the coating of said at least two silver halide emulsions.

The radiographic element is associated with the intensifying screens so as to be exposed to the radiation emitted by said screens. The pair of screens employed in combination with the radiographic element is symmetrical or unsymmetrical. The screens are made of relatively thick phosphor layers which transform the X-rays into light radiation (e.g., visible light). The screens absorb a portion of X-rays much larger than the radiographic element and are used to reduce the radiation dose necessary to obtain a useful image.

The phosphors used in the intensifying screens have an emission maximum wavelength in the ultraviolet, blue, green, red or infrared region of the electromagnetic spectrum according to the region of the electromagnetic spectrum to which said at least two silver halide emulsion layers are sensitive. More preferably, said phosphors emit radiation in the ultraviolet, blue and green regions of the electromagnetic spectrum.

The green emitting phosphors emit radiation having more than about 80% of its spectral emission above 480 nm and its maximum of emission in the wavelength range of 530–570 nm. Green emitting phosphors which may be used in the intensifying screens include rare earth activated rare earth oxysulfide phosphors of at least one rare earth element selected from yttrium, lanthanum, gadolinium and lutetium, rare earth activated rare earth oxyhalide phosphors of the same rare earth elements, a phosphor composed of a borate of the above rare earth elements, a phosphor composed of a phosphate of the above rare earth elements and a phosphor composed of tantalate of the above rare earth elements. These rare earth green emitting phosphors have been extensively described in the patent literature, for example in U.S. Pat. Nos. 4,225,653, 3,418,246, 3,418,247, 3,725,704, 3,617,743, 3,974,389, 3,591,516, 3,607,770, 3,666,676, 3,795,814, 4,405,691, 4,311,487 and 4,387,141. These rare earth phosphors have a high X-ray absorbing power and high efficiency of light emission when excited with X radiation and enable radiologists to use substantially lower X radiation dosage levels.

The binder employed in the fluorescent layer of the intensifying screens can be, for example, one of the binders commonly used in forming layers: gum arabic, protein such as gelatin, polysaccharides such as dextran, organic polymer binders such as polyvinylbutyral, polyvinylacetate, nitrocellulose, ethylcellulose, vinylidene-chloride-vinylchloride copolymer, polymethylmethacrylate, polybutyl methacrylate, vinylchloride-vinyl-acetate copolymer, polyurethane, cellulose acetate butyrate, polyvinyl alcohol, and the like.

Generally, the binder is used in an amount of 0.01 to 1 part by weight per one part by weight of the phosphor. However, from the viewpoint of the sensitivity and the sharpness of the screen obtained, the amount of the binder should preferably be small. Accordingly, in consideration of both the sensitivity and the sharpness of the screen and the easiness of application of the coating dispersion, the binder is preferably used in an amount of 0.03 to 0.2 parts by weight per one part by weight of the phosphor. The thickness of the fluorescent layer is generally within the range of 10 μm to 1 mm.

The present invention will be now illustrated in greater details by reference to the following example.

EXAMPLE

FILM A. A tabular silver bromide emulsion (having an average diameter:thickness ratio of 8.1) was optically sensitized to green light with anhydro-5,5'-dichloro-9-ethyl-bis (3-sulfopropyl)-oxacarbocyanine hydroxide triethylamine salt and chemical sensitized with sulfur and gold compounds. The emulsion containing wetting agents, 5-methyl-7-hydroxytriazaindolizine stabilizer and 1,2-bisvinylsulfonyl-2-propanol hardener was coated on each side of a blue tinted polyethyleneterephthalate support at a silver coverage of 2 $g/m^2$ and gelatin coverage of 1.6 $g/m^2$ per side. A gelatin protective layer containing matting agents, 1,2-bisvinylsulfonyl-2-propanol hardener and 1.1 $g/m^2$ gelatin per side was coated on each emulsion layer.

SCREEN A. A green emitting phosphor screen was prepared consisting of a $Gd_2O_2S$:Tb phosphor with average particle size of 4.5 mm coated in a hydrophobic polymer binder at a phosphor coverage of 150 $g/m^2$ and a thickness of 40 mm on a polyethyleneterephthalate support. The phosphor was overcoated with a cellulose triacetate layer.

EXPOSURE. Pairs of Screens A were put in contact with Film A in an Imation Trimatic™ C Cassette and exposed as follows. Film-screen assembly was made in which one screen was in contact with one emulsion layer and the other screen was in contact with the other emulsion layer. The film-screen assembly was exposed to X-rays from a tungsten target tube operated at 80 $Kv_p$ and 25 mA from a distance of 120 cm. The X-rays passed through an aluminum step wedge (EXPOSURE A) or an aluminum resolution target (EXPOSURE B) before reaching the screen-film assembly.

PROCESSING. Following exposure, the film was processed in an Imation Trimatic™ XP507 Processor using Processing A or Processing B shown below.

| Step | Time | Temperature |
| --- | --- | --- |
| Processing A | | |
| Development | 8" | 40° C. |
| Fix | 8" | 35° C. |
| Wash | 20" | 35° C. |
| Drying | 22" | 35° C. |
| Processing B | | |
| Development | 8" | 40° C. |
| Stabilization | 4" | room temp |
| Spray Rinse | 4" | room temp |
| Drying | 22" | 35° C. |

The composition of the processing solutions used in the Processings A and B were as follows.

Developer:

| | | |
|---|---|---|
| $Na_2S_2O_5$ | g | 30 |
| KOH 35% (w/w) | g | 35 |
| $K_2CO_3$ | g | 41 |
| Ethyleneglycol | g | 7.5 |
| Diethanolamine | g | 6 |
| Ethanolamine | g | 10 |
| DTPA.5Na 40% (w/w) | g | 12.5 |
| 1-Phenyl-1H-tetrazole-5-thiol | mg | 15 |
| 5-Methyl-benzotriazole | mg | 125 |
| KBr | g | 1.5 |
| Dimezone S | g | 1.3 |
| Hydroquinone | g | 12 |
| $K_2S_4O_6$ | mg | 150 |
| $Na_2S_2O_3$ | mg | 190 |
| Water to make | liter | 1 |
| pH | | 10.70 |

Fixer:

| | | |
|---|---|---|
| $(NH_4)_2S_2O_3$ | g | 145 |
| $Na_2SO_3$ | g | 8 |
| Boric acid | g | 7 |
| Acetic acid | g | 22.5 |
| $NH_4OH$ 25% (w/w) | g | 17 |
| Aluminum sulfate | g | 7.7 |
| Sulfuric acid | g | 3.6 |
| Water to make | liter | 1 |
| pH | | 4.30 |

Stabilizer:

| | | |
|---|---|---|
| $K_2CO_3$ | g | 10 |
| 1-Phenyl-1H-tetrazole-5-thiol | g | 5 |
| Water to make | liter | 1 |

Samples of Film A, exposed according to Exposure A or Exposure B, were processed according to Processing A or Processing B, as reported in the following Table 1.

TABLE 1

| Sample | Film | Exposure | Processing |
|---|---|---|---|
| A | A | A | A |
| B | A | B | A |
| C | A | A | B |
| D | A | B | B |
| E | A | B | B* |
| F | A | B | B* ** |
| G | A | A | B*** |
| H | A | A | B**** |

*Development: 10" at 40° C.
**Plus 70" Fixing after Stabilization
***Development: 15" at 40° C.
****Development: 35" at 40° C.

The processed samples of photographic films were then fed into a film digitizer as described in FIG. 1, wherein scanning of the film was effected line-wise using a focused He-Ne 633 nm laser beam (60 mm FWHM). Image-wise modulated scanning radiation was detected using a Thorn Emi 9658 red-sensitive photomultiplier. Signal was amplified by a current sensitive preamplifier (EG&G model 181), low pass filter (EG&G Parc model 113) and, optionally, Analog Devices 755 based log filter. Signal was then recorded using a digitizing oscilloscope. The results have shown that no image MTF variation is detected for samples processed with Processing A and Processing B (55% at 2 lp/mm and 24% at 4.5 lp/mm). It has also found that faster Processing B provides images which significantly improve the capability of reading out high optical densities, resolution capability is not critical versus overdevelopment, and image MTF of unfixed samples is maintained also after a later fixing.

We claim:

1. Method for processing and digitizing an exposed black and white silver halide photographic film comprising the steps of
    (a) feeding an exposed silver halide photographic film to processing means in which said exposed silver halide photographic film is processed to form an analog image on said film, and
    (b) feeding said analog image to digitizing means in which said analog image is photoelectrically read-out to form a digital image representing said analog image,
    wherein the processing of said exposed silver halide photographic film comprises the steps of developing, stabilizing and drying.

2. Method of digital imaging of a processed photographic film in which the processed film comprising an analog image is read out by using a film digitizer to form a digital image representing said analog image,
    wherein said analog image comprises silver and light-stable silver complexes.

* * * * *